United States Patent
Shultz et al.

(10) Patent No.: US 7,490,324 B2
(45) Date of Patent: *Feb. 10, 2009

(54) SYSTEM AND METHOD FOR TRANSFERRING DATA BETWEEN VIRTUAL MACHINES OR OTHER COMPUTER ENTITIES

(75) Inventors: Steven S. Shultz, Endicott, NY (US); Xenia Tkatschow, Jamesville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/877,937

(22) Filed: Oct. 24, 2007

(65) Prior Publication Data

US 2008/0046885 A1 Feb. 21, 2008

Related U.S. Application Data

(60) Continuation of application No. 11/559,936, filed on Nov. 15, 2006, now Pat. No. 7,299,464, which is a division of application No. 10/280,987, filed on Oct. 24, 2002, now Pat. No. 7,181,744.

(51) Int. Cl.
  G06F 9/455 (2006.01)
  G06F 9/46 (2006.01)
  G06F 5/00 (2006.01)
(52) U.S. Cl. .............................. 718/1; 718/104; 710/47
(58) Field of Classification Search .................. 718/1, 718/104; 710/47
See application file for complete search history.

(56) References Cited

U.S. PATENT DOCUMENTS

| | | | |
|---|---|---|---|
| 4,812,967 A | 3/1989 | Hirosawa et al. | |
| 4,835,685 A | 5/1989 | Kun | |
| 5,446,841 A | 8/1995 | Kitano et al. | |
| 5,953,538 A | 9/1999 | Duncan et al. | |
| 6,115,779 A | 9/2000 | Haubursin et al. | |
| 6,154,832 A | 11/2000 | Maupin | |
| 6,314,501 B1 | 11/2001 | Gulick et al. | |
| 6,332,180 B1 | 12/2001 | Kauffman et al. | |
| 6,347,341 B1 | 2/2002 | Glassen et al. | |
| 6,397,350 B1 | 5/2002 | Baskey et al. | |
| 6,920,485 B2 * | 7/2005 | Russell ....................... 709/214 |
| 2002/0062401 A1 | 5/2002 | Auslander et al. | |
| 2003/0037178 A1 | 2/2003 | Vessey et al. | |

* cited by examiner

*Primary Examiner*—Thomas Lee
*Assistant Examiner*—Camquy Truong
(74) *Attorney, Agent, or Firm*—Arthur J. Samodovitz

(57) ABSTRACT

A method for communication between first and second computer programs having a shared memory. The first computer program has a first work dispatcher for a first work queue. The second computer program has a second work dispatcher for a second work queue. Without causing an interrupt, a message or data is written for the second program from the first program to the shared memory and the second work queue is updated with a work item indicating a message or data for the second program. In association with the updating step, it is determined if the second program is currently busy. If so, the second program is not interrupted regarding the message or data. When the second program subsequently becomes not busy, the second program receives, without an interrupt, and executes the work item to receive the message or data. If the second program was not currently busy, the second program is interrupted to process the message or data on its work queue. This imposes a minimal burden on the second program.

3 Claims, 6 Drawing Sheets

SYSTEM AND METHOD FOR TRANSFERRING DATA BETWEEN VIRTUAL MACHINES OR OTHER COMPUTER ENTITIES

CROSS REFERENCE TO RELATED APPLICATIONS

This is a continuation of U.S. patent application Ser. No. 11/559,936 filed on Nov. 15, 2006 now U.S. Pat. No. 7,299,464 which is a divisional of U.S. patent application Ser. No. 10/280,987 filed on Oct. 24, 2002 now U.S. Pat. No. 7,181,744.

BACKGROUND OF THE INVENTION

The invention relates generally to computer systems and deals more particularly with an efficient technique for transferring messages and data between virtual machines, logical partitions or application programs.

There are many computer environments in which two or more computer entities need to exchange messages or data. Such computer entities include virtual machines, logical partitions and applications running on a unitary operating system such as Unix or Windows NT.

A virtual machine operating system is well known today and comprises a common base portion and separate user portions. In an IBM z/VM operating system, the common base portion is called the "Control Program" or "CP" and each user portion is called a "virtual machine" or "guest". Many applications can run on each virtual machine. Each virtual machine has its own work dispatcher (and associated work queue) and appears to the user and his or her applications as a personal operating system. Each virtual machine executes commands on behalf of the applications they support. The different virtual machines can communicate with each other through the common base portion. The communications between the different virtual machines via CP may be in the form of messages conveyed by virtualized communication devices such as Guest Lan or IBM proprietary protocols such as IUCV. Though these communications are conveyed by a variety of protocols, all of these communication mechanisms have at least four common properties:

a) Message data is first written into the sender's virtual address space.
b) An interrupt is generated for each message in each of the receivers' virtual machines. This invokes interrupt handling in each receiver virtual machine.
c) CP must be invoked in order to accomplish the communication.
d) CP copies message data from the sender's virtual address space to all of the receivers' virtual address spaces.

With the foregoing communication methods there is significant overhead associated with invoking CP, generating interrupts, processing interrupts, and copying the message data from the sender's virtual address space to the virtual address space of each of the receivers.

The following is a more detailed description of IUCV. IUCV is an IBM proprietary point-to-point protocol. A point-to-point protocol transfers data from one sender to one receiver. To communicate via IUCV, a sender first invokes CP indicating the identity of the intended receiver of communication. CP generates an interrupt to the receiver and if the receiver agrees to communicate, CP provides the receiver with a communication path id. CP also then interrupts the sender and provides the sender with the communication path id. To send data, the sender invokes CP indicating the previously obtained path id and the data to be sent. CP uses the path id to identify the receiver and generates an interrupt to the receiver. The receiver responds to the interrupt by invoking CP to receive the data. CP then copies the data from the sender's virtual address space to the receiver's virtual address space and generates an interrupt to the sender indicating that the data has been transferred.

The following is a more detailed description of Guest Lan. Guest Lan is a virtualized communication device using local area network (LAN) protocol. Lan protocol allows communication between a sender and multiple receivers simultaneously. To communicate via a Guest Lan, both sender and receivers invoke CP indicating that they wish to participate in the Guest Lan. To send data, the sender invokes CP indicating the data to be sent and which receivers should get the data. CP generates an interrupt for each identified receiver. The receivers each respond by invoking CP to receive the data. CP then copies the data from the sender's virtual address space to the virtual address spaces of each of the receivers. Once all receivers have received the data, CP generates an interrupt to the sender indicating that the data has been transferred to all receivers.

A logical partition environment is also well known today. A logical partition is a logical division of resources of a single computer system, which division is accomplished by software and microcode. Each logical partition is defined by a respective configuration of CPU(s), memory and peripheral devices. An operating system running in a logical partition views its logical partition as nearly indistinguishable from a real computer, although the logical partition may provide some additional services not available on a real machine. Therefore, the operating system is largely unaware that it is running in a logical partition, and is largely unaware of other logical partitions of the same real computer. Each logical partition also has its own dispatcher, and uses interrupts to communicate messages/data from one logical partition to another as in the virtual machine environment.

There are other known techniques for one application to communicate with another application when both applications are running on the same operating system, such as Windows NT or Unix. In this environment, the operating system utilizes the same dispatcher for both applications. According to these known communication techniques, when application "A" wants to communicate with application "B", application A calls/notifies the supervisor within the operating system. The call includes the address of the message/data in memory accessible by application A. In response, the supervisor copies the message/data to a location that application B can access. Next, the supervisor puts a work element on the dispatch queue. The work element identifies application B as the recipient, and includes a command to fetch the message/data. Then, the dispatcher dispatches the work element to application B at a time consistent with the dispatching strategy of the operating system and the relative priorities of the work elements. The following are some of the possible, known dispatching strategies. If application B is not currently busy, then the message/data work element is dispatched to application B when the processor becomes free and/or is not occupied with processing higher priority work elements (for any application). If application B is currently busy with another, lower priority work item, then the dispatcher may substitute the message/data work item when the lower priority work item completes its allotted processor time slice or makes a call to the operating system. But, it would not be appropriate to "interrupt" the operating system to convey the message/data to application B because of the overhead involved. The sharing of the dispatcher makes this unnecessary. As noted above, virtual machine, logical partition and other environments do not have a common dispatcher.

An object of the present invention is to provide an efficient method for communication/data transfer between (a) two different virtual machines running on the same base operating system, (b) two logical partitions of the same computer or (c) two applications running on the same computer but having different dispatchers.

An object of the present invention is to provide an efficient method for communication/data transfer from (a) one virtual machine to two or more other virtual machines all running on the same base operating system, (b) from one logical partition to two or more other logical partitions of the same computer or (c) one application to two or more other applications running on the same computer but having different dispatchers.

SUMMARY OF THE INVENTION

The invention resides in a method for communication between first and second computer programs having a shared memory. The first computer program has a first work dispatcher for a first work queue. The second computer program has a second work dispatcher for a second work queue. A message or data is written for the second program from the first program to the shared memory and the second work queue is updated with a work item indicating a message or data for the second program. In association with the updating step, it is determined if the second program is currently busy. If so, the second program is not interrupted regarding the message or data. When the second program subsequently becomes not busy, the second program receives, without an interrupt, and executes the work item to receive the message or data. If the second program was not currently busy, the second program is interrupted to process the message or data on its work queue. (This imposes a minimal burden on the second program.)

According to another feature of the present invention, there is a method for communication between first and second virtual machines having a shared memory and a common base operating system. The first virtual machine has a first work dispatcher for a first work queue. The second virtual machine has a second work dispatcher for a second work queue. The first and second work queues reside in memory shared by both the first and second virtual machines. Without invoking the common base operating system, a message or data is written for the second virtual machine from the first virtual machine to the shared memory and the second work queue is updated with a work item indicating a message or data for the second virtual machine. Subsequently, the second virtual machine program reads the message or data from the shared memory.

DETAILED DESCRIPTION OF THE PREFERRED EMBODIMENTS

Figure 1:
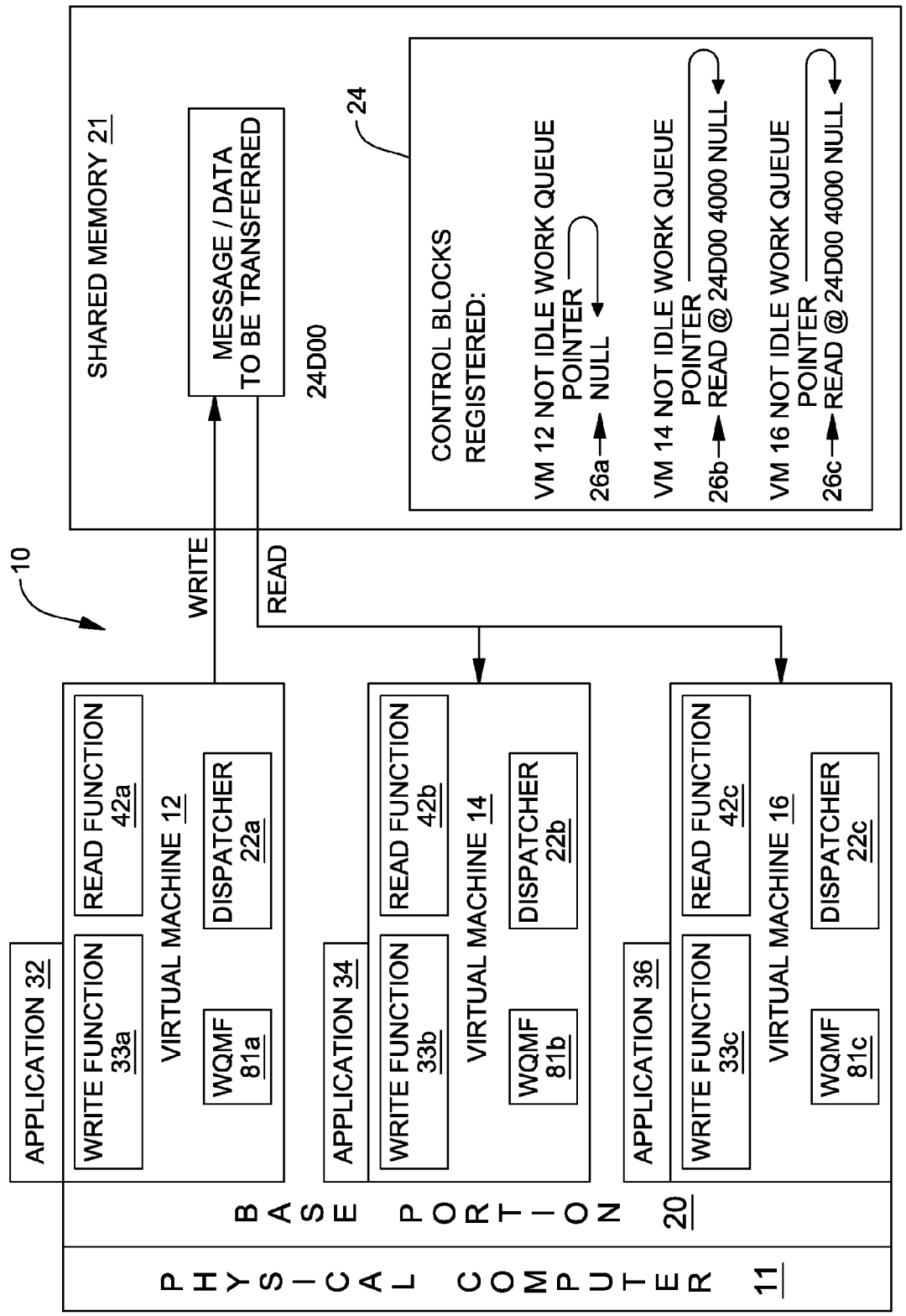
FIG. 1 is a block diagram of a virtual machine operating system according to the present invention.

Referring now to the figures in detail, wherein like reference numbers indicate like elements throughout, FIG. 1 illustrates a virtual machine operating system generally designated 10 according to the present invention. By way of example, virtual machine operating system 10 can be IBM z/VM version 4.2.0 or 4.3.0 operating system although the present invention can be incorporated into other virtual machine and non virtual machine operating systems as well. The details of the z/VM 4.2.0 operating system are disclosed in IBM publication "z/VM 4.2.0 General Information" (Document Number: GC24-5991-03) which is available from International Business Machines Corp. at PO Box 29570, IBM Publications, Raleigh, N.C. 27626-0570 or on the WWW at www.IBM.com/shop/publications/order. This publication is hereby incorporated by reference as part of the present disclosure. Operating system 10 executes in a physical computer 11 such as an IBM zSeries mainframe although the present invention can be implemented in other server computers or personal computers as well. Operating system 10 comprises user portions 12, 14, 16 . . . (called "virtual machines" or "guest virtual machines" in the z/VM operating system) and common base portion 20 (called "CP" in the z/VM operating system). Each user portion 12 and 14 provides standard operating system functions such as I/O, communication, etc. Each user portion 12, 14 and 16 is capable of concurrently executing a number of different applications such as applications 32, 34 and 36 as shown. By way of examples, applications 32, 34 and 36 can be TELNET, FTP and PING (and use the present invention instead of the prior art communication mechanisms). In the z/VM 4.2.0 and 4.3.0 operating systems, the Linux (TM of Linus Torvalds) operating system can also run on each virtual machine 12, 14 and 16, although some of the operating system functions of virtual machines 12, 14 or 16 are not needed by the Linux operating system as they are currently provided by the Linux operating system. Although not shown, typically there are many other virtual machines and associated operating systems which also share common base portion 20. Also, there can be multiple applications executing on each virtual machine. Base portion 20 includes known functions such as virtualized memory, virtualized devices, and virtualized CPUs.

Computer 11 also includes memory area 21 which is shared by all of the virtual machines 12, 14, 16 etc. Being "shared" each virtual machine can directly address and access the shared memory area 21 to read data therefrom or write data thereto. For data requested by an application or generated by an application, the application makes the read or write request to the respective virtual machine on which it is running. This respective virtual machines accesses the shared memory on behalf of the application as explained below with reference to FIGS. 2 and 3. In one (of many) embodiments of the present invention, the shared memory 21 is part of a Discontiguous Saved Segment ("DCSS") portion of the base portion 20. DCSS is a special form of shared memory that can be dynamically loaded and unloaded. It can survive virtual machine termination and even CP termination, and can contain executable code. However, functions other than shared memory within DCSS are not needed for the present invention, so the present invention is not limited to implementations involving DCSS or its equivalents.

Each virtual machine 12, 14, and 16 includes a respective read function 42a, 42b, and 42c, a respective write function 33a, 33b and 33c and a respective dispatcher 22a, 22b and 22c. The virtual machine calls the write function when it encounters a write command in the application it is executing. The write function is standing by, so no queue is required for the write function tasks. The write function writes data from a virtual machine to the shared memory. A write operation does not invoke CP. The virtual machine calls the read function when it encounters a read command in the application it is executing. The read function is standing by, so no queue is required for the read function tasks. The read function reads data from the shared memory. Thus, the data is not copied from the writer's virtual address space to the reader's virtual address space. Also, CP is not invoked to read from shared memory, and this reduces overhead. Each virtual machine calls/invokes its dispatcher when it completes a work item and therefore, needs another work item, if any. In response to the call, the dispatcher checks for work items on its respective queue 26a, 26b or 26c within shared memory 21.

A table 24 is also stored in shared memory 21. The table indicates the status of each virtual machine 12, 14, 16. Each virtual machine 12, 14 and 16 also includes a computer readable storage media such as a disk storage or memory which stores a respective Work Queue Management Function ("WQMF") 81a, 81b or 81c which adds work items to work queues when they arise and updates the status of each virtual machine as "idle" or "not idle" as described below. Table 24 includes an identity of each virtual machine and an indication whether or not the respective virtual machine is idle. Table 24 also includes for each virtual machine, a pointer to the respective work queue 26a, 26b or 26c. Table 24 changes as the status changes. In the example illustrated in FIG. 1, currently virtual machine 12 is not idle, i.e. it is currently executing another work item/task. However, virtual machine 12 currently has nothing in its work queue 26a to do after completing its current work item. Virtual machine 14 is currently idle, but has a work item in its queue 26b. The work item in queue 26b is to read the contents of the shared memory beginning at location 24D00 and extending for the specified length. (The word "null" following the work item indicates that there are no further work items in the queue.) Virtual machine 16 currently is not idle, and has a work item in its queue 26c. The work item in queue 26c is to read the contents of the shared memory beginning at location 24D00 and extending for the specified length.

Figure 2:
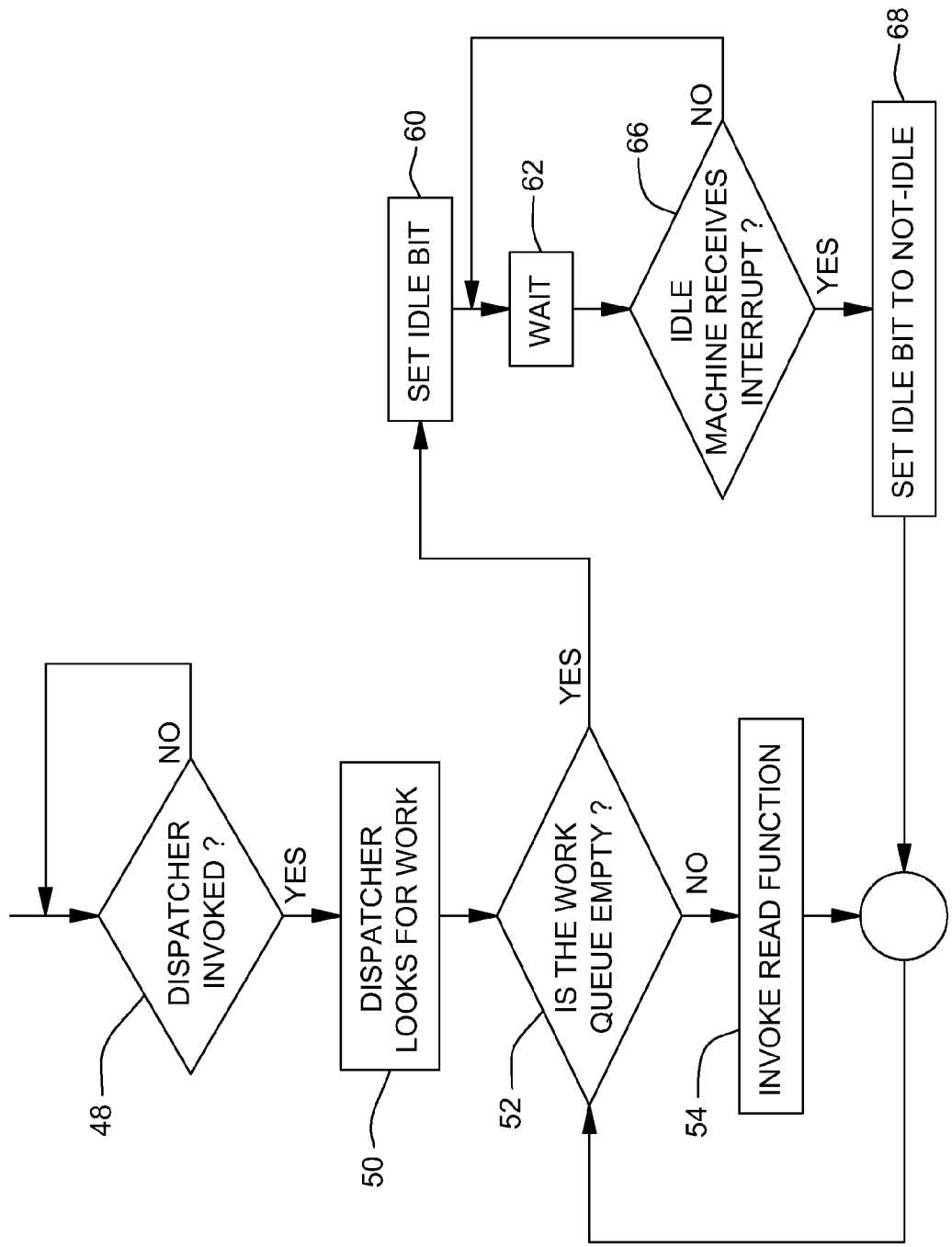
FIG. 2 is a flow chart illustrating a process implemented by a virtual machine of FIG. 1 to receive a message or data from another virtual machine, according to the present invention.

FIG. 2 is a flow chart illustrating operation of each of the dispatchers, i.e. each of the dispatchers implements the steps of FIG. 2 separately from the other dispatchers. After a virtual machine completes each work item/task it invokes its dispatcher to look for a new work item to perform (decision 48). In response, the dispatcher within the virtual machine checks the respective work queue (work queue 26a for dispatcher 22a, work queue 26b for dispatcher 22b and work queue 26c for dispatcher 26c) for a work item (step 50). If there is a work item in the queue (decision 52), then the dispatcher parses the work item to determine its nature and what function to call to perform the work item. In the case of a read request, the dispatcher calls the read function to read the message/data at the location indicated by the work item. Thus, this read can be accomplished without the generation of an interrupt and without invoking interrupt handling. Then, the dispatcher loops back to decision 52 to check the work queue again. If during any iteration of decision 52, there is no work item in the work queue, then the dispatcher sets the status field in the table 24 as "idle" for the respective virtual machine (step 60). Then, the dispatcher notifies the virtual machine to enter into a wait state (step 62). In this wait state, the virtual machine is in a "sleeping" or "idle" mode where it is not executing any work items for an application or itself. The virtual machine will remain in this wait state until receiving an interrupt indicative of a new work item in its work queue (decision 66). When such an interrupt is received, the WQMF for the virtual machine sets the status field in the table 14 as "non idle" for the respective virtual machine (step 68). Next, the dispatcher loops back to decision 52 to check the work queue for a work item. At this time, there should be a work item in the work queue.

Figure 3:
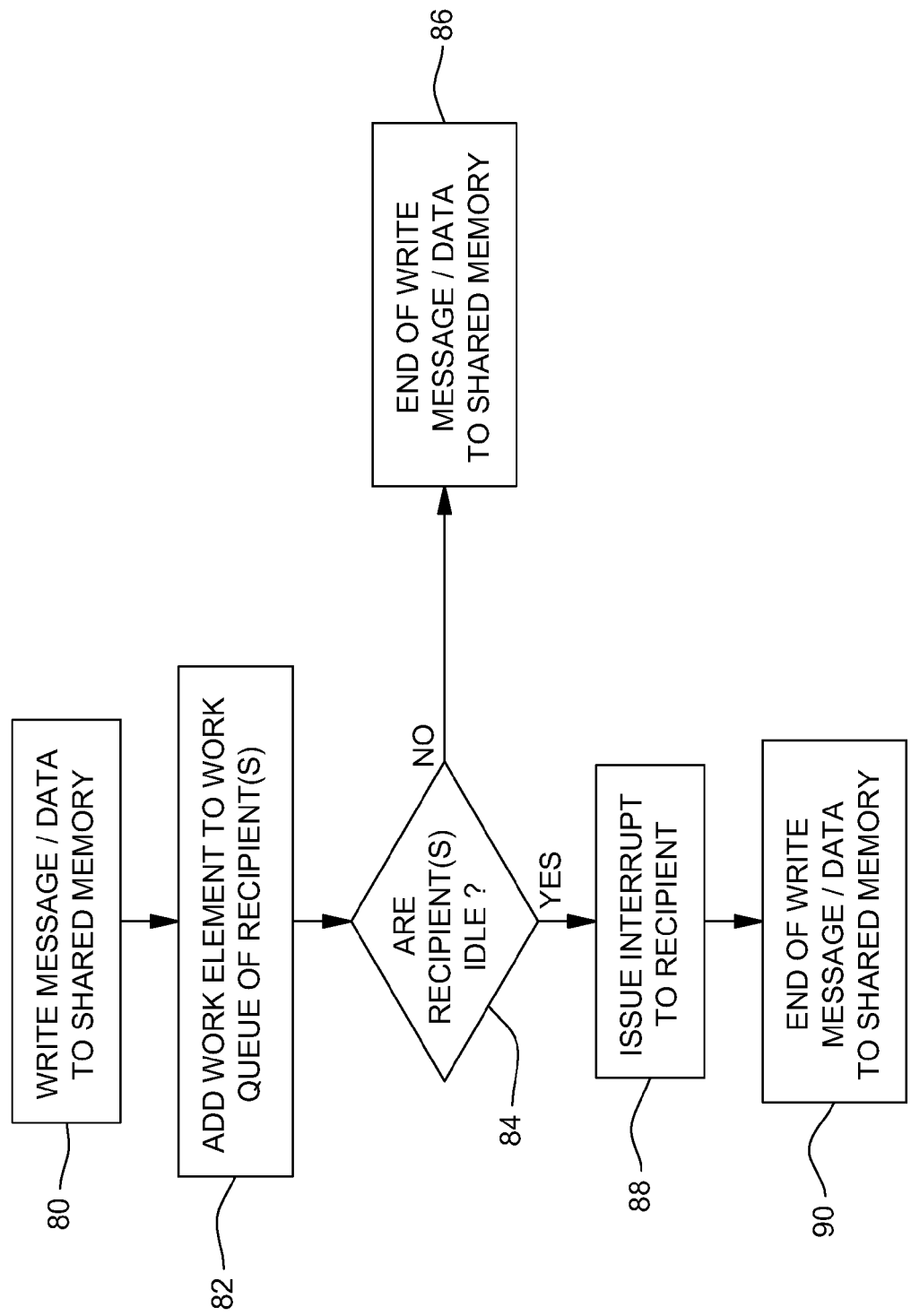
FIG. 3 is a flow chart illustrating a process implemented by a virtual machine of FIG. 1 to send a message or data to another virtual machine, according to the present invention.

FIG. 3 illustrates operation of one of the virtual machines, for example virtual machine 12 when it desires to send a message/data to another of the virtual machines, for example virtual machine 14. In step 80, virtual machine 12 calls its write function 33a to write data to the shared memory 21. As explained above, each of the virtual machines has direct access to the shared memory by providing the appropriate address. So, the write function 33a of virtual machine 12 writes the data to the shared memory by specifying the address to be written and furnishing the data to be written. Next, Work Queue Management function ("WQMF") 81a within virtual machine 12 adds a work item to the work queue 26b of virtual machine 14, by writing the work item onto the work queue (step 82). Because the work queue is in shared memory, this does not require invocation of CP. Next, WQMF 81a determines if virtual machine 14 is currently idle by checking the table 24 (decision 84). If not, then virtual machine 12 does nothing further to complete this communication and CP is not invoked at any point in the communication process (termination step 86). In accordance with the present invention, virtual machine 12 does not interrupt virtual machine 14 because of the overhead involved in interrupting the virtual machine. As explained above with reference to FIG. 2, when virtual machine 14 completes its current work item, it will automatically invoke/call its dispatcher to check its work queue for another work item (decision 48 and step 50). At that time it will see the work item from virtual machine 12. Referring again to decision 84, if virtual machine 14 is idle, then in accordance with the present invention, virtual machine 12 issues a "wakening" type of interrupt to virtual machine 14 (step 88). This requires invocation of CP. The wakening type of interrupt alerts/invokes virtual machine 14 that there is a work item in its queue 26b. With the issuance of this interrupt, virtual machine 12 has completed its part of the data communication. The "wakening" interrupt automatically causes virtual machine 14 to activate its dispatcher 22b (decision 48 of FIG. 2) to check its work queue for a work item. Dispatcher 22b then implements the steps illustrated in FIG. 2 to check its work queue 26b (step 50 and decision 52) and then read the data (step 54).

FIG. 3 also illustrates operation of one of the virtual machines, for example virtual machine 12 when it desires to communicate with two or more other virtual machines, for example virtual machines 14 and 16. In step 80, virtual machine 12 calls its write function 32a to write data to the shared memory 21. So, virtual machine 12 writes the data to the shared memory by specifying the address to be written and furnishing the data to be written. In the example illustrated in FIG. 1, the data was written to shared memory locations beginning at address 24D00. Next, WQMF 81a within virtual machine 12 adds a work item to the work queues 26b and 26c of virtual machines 14 and 16, by writing the work item, data address and data length onto the work queues (step 82). Next, WQMF 81a within virtual machine 12 determines if virtual machines 14 and 16 are currently idle by checking the table 24 (decision 84). In the example illustrated in FIG. 1, virtual machine 14 is idle but virtual machine 16 is busy. So, for virtual machine 16 which is busy, virtual machine 12 does nothing further to complete the communication (termination step 86). In accordance with the present invention, virtual machine 12 does not interrupt the busy virtual machine 16 because of the overhead involved in interrupting a virtual machine. As explained above with reference to FIG. 2, when the busy virtual machine 16 completes its current work item, it will automatically check its work queue for another work item (decision 48 and step 50). At that time it will see the work item from virtual machine 12 and the communication will be completed without invocation of CP. Referring again to decision 84, because virtual machine 14 is idle, then in accordance with the present invention, virtual machine 12 issues a "wakening" type of interrupt to the idle virtual machine 14 (step 88). The wakening type of interrupt alerts/invokes the idle virtual machine 14 that there is a work item in its queue. With the issuance of this interrupt, virtual machine 12 has completed its part of the data communication. The "wakening" interrupt automatically causes the idle virtual machine 14 to invoke/call its dispatcher 22b to check its work queue for a work item. Dispatcher 22b then implements the steps illustrated in FIG. 2 to check its work queue 26b (decision 52) and then read the data (step 54).

Figure 4:
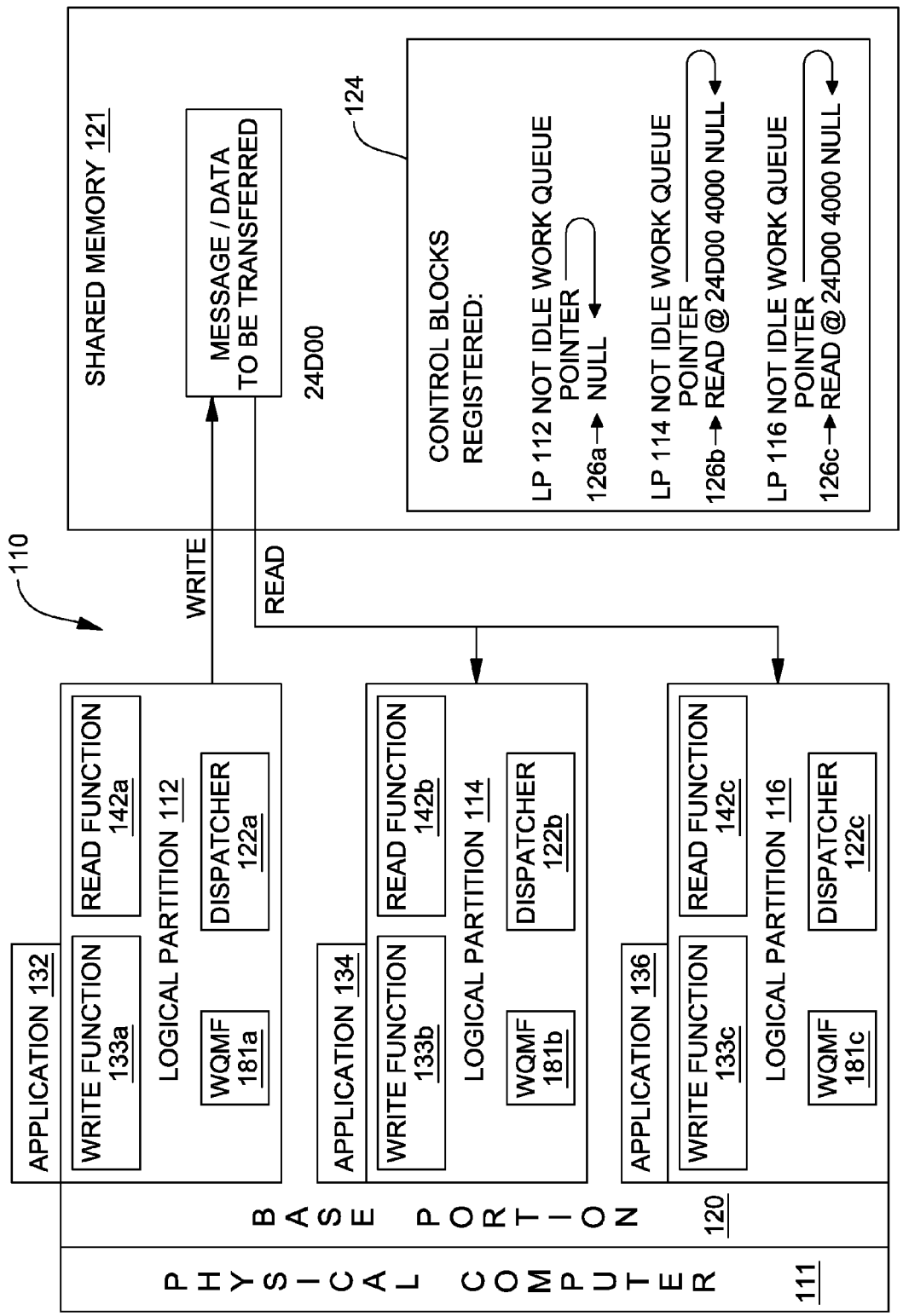
FIG. 4 is a block diagram of a logically partitioned computer system according to the present invention.

FIG. 4 illustrates a logically partitioned computer system generally designated 110 according to the present invention. System 110 is a logical partition of a physical computer 111 such as an IBM zSeries mainframe although the present invention can be implemented in other server computers or personal computers as well. System 110 comprises logical partitions 112, 114, 116. Each logical partition 112, 114 and 116 provides standard operating system functions such as I/O, communication, etc. to its applications. Each logical partition 112, 114 and 116 is capable of concurrently executing a number of different applications such as applications 132, 134 and 136 as shown. By way of examples, applications 132, 134 and 136 can be Telnet, FTP and Ping (and use the present invention instead of the prior art communication mechanisms). Base portion 120 participates in the actual logical partitioning of the computer 111 and its resources, i.e. partitions the CPU(s), partitions memory, partitions I/O, etc. The functions of one example of base portion 120 and logical partitions 112, 114 and 116, aside from the present invention, are described in a document entitled "Enterprise System/9000 9221 Processors: Operating Your System—Volume 2 (Logically Partitioned Mode)", Publication # SA24-4351-02, which document is available International Business Machines at PO Box 29570, IBM Publications, Raleigh, N.C. 27626-0570 or on the WWW at www.IBM.com/shop/publications/order.

Computer 111 also includes memory area 121 which is shared by all of the logical partitions 112, 114, 116 etc. Being "shared" each logical partition can directly address and access the shared memory area 121 to read data therefrom or write data thereto. For data requested by an application or generated by an application, the application makes the read or write request to the respective logical partition on which it is running. This respective logical partition accesses the shared memory on behalf of the application as explained below with reference to FIGS. 5 and 6.

Each logical partition 112, 114, and 116 includes a respective read function 142a, 142b, and 142c, a respective write function 133a, 133b and 133c and a respective dispatcher 122a, 122b and 122c. The logical partition calls the write function when it encounters a write command in the application it is executing. The write function is standing by, so no queue is required for the write function tasks. The write function writes data from a logical partition to the shared memory, and therefore does not invoke base portion 120. The logical partition calls the read function when it encounters a read command in the application it is executing. The read function is standing by, so no queue is required for the read function tasks. The read function reads data from the shared memory, and therefore does not invoke base portion 120. Also, the data is not copied from the writer's virtual address space to the reader's virtual address space. Each logical partition calls/invokes its dispatcher when it completes a work item and therefore, needs another work item, if any. In response to the call, the dispatcher checks for work items on its respective queue 126a, 126b or 126c within shared memory 121.

A table 124 is also stored in shared memory 121. The table indicates the status of each logical partition 112, 114, 116. Each logical partition 112, 114 and 116 also includes a respective WQMF 181a, 181b or 181c which adds work items to work queues when they arise and updates the status of each logical partition as "idle" or "not idle" as described below. Table 124 includes an identity of each logical partition and an indication whether or not the respective logical partition is idle. Table 124 also includes for each logical partition, a pointer to the respective work queue 126a, 126b or 126c. Table 124 changes as the status changes. In the example illustrated in FIG. 4, currently logical partition 112 is not idle, i.e. it is currently executing another work item/task. However, logical partition 112 currently has nothing in its work queue 126a to do after completing its current work item. Logical partition 114 is currently idle, but has a work item in its queue 126b. The work item in queue 126b is to read the contents of the shared memory beginning at location 24D00 and extending for the specified length. (The word "null" following the work item indicates that there are no further work items in the queue.) Logical partition 116 currently is not idle, and has a work item in its queue 126c. The work item in queue 126c is to read the contents of the shared memory beginning at location 24D00 and extending for the specified length.

Figure 5:
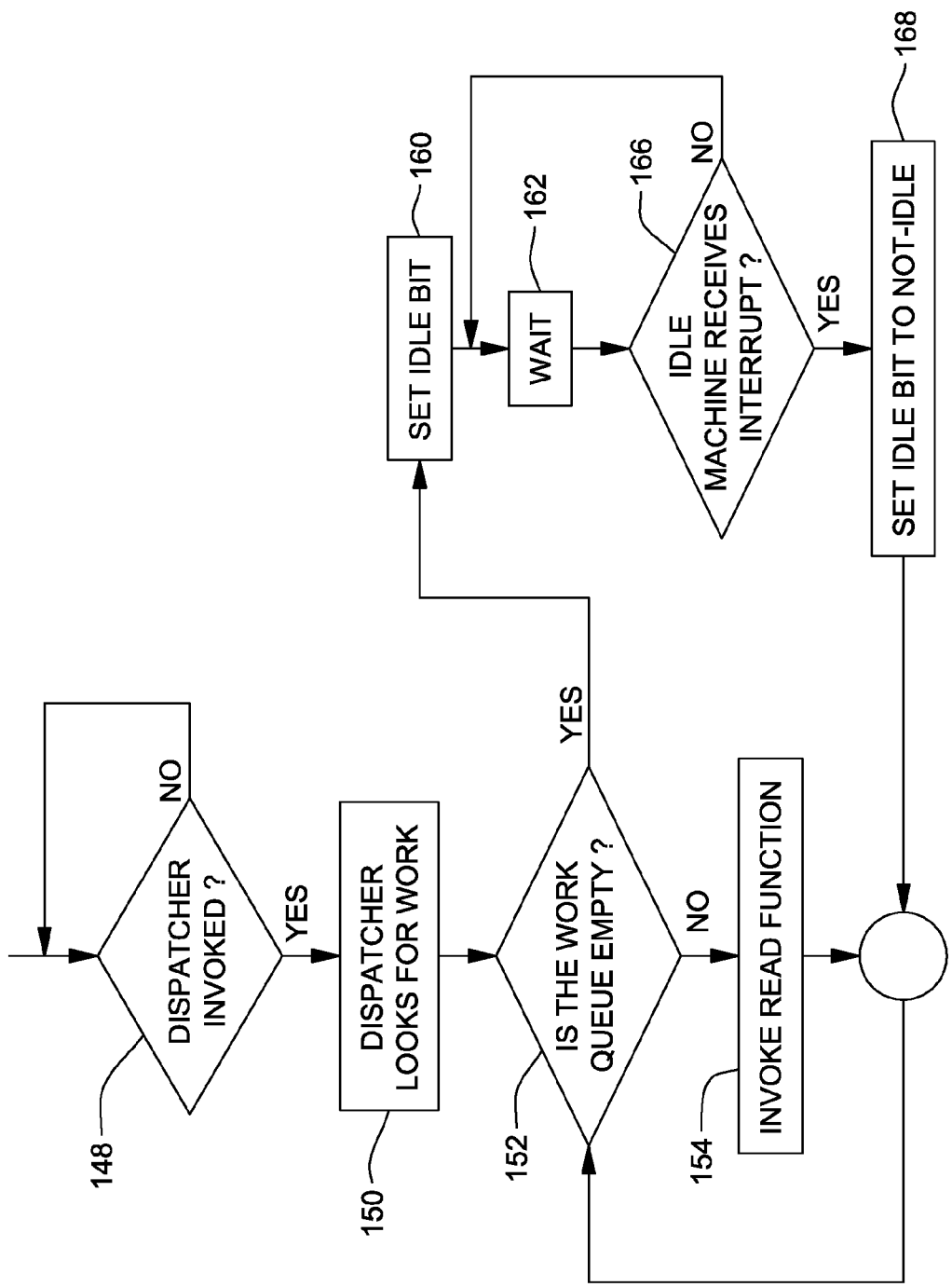
FIG. 5 is a flow chart illustrating a process implemented by a logical partition of the computer system of FIG. 4 to receive a message or data from another logical partition, according to the present invention.

FIG. 5 is a flow chart illustrating operation of each of the dispatchers, i.e. each of the dispatchers implements the steps of FIG. 5 separately from the other dispatchers. After a logical partition completes each work item/task it invokes its dispatcher to look for a new work item to perform (decision 148). In response, the dispatcher within the logical partition checks the respective work queue (work queue 126a for dispatcher 122a, work queue 126b for dispatcher 122b and work queue 126c for dispatcher 126c) for a work item (step 150). If there is a work item in the queue (decision 152), then the dispatcher parses the work item to determine its nature and what function to call to perform the work item. In the case of a read request, the dispatcher calls the read function to read the message/data at the location indicated by the work item. Thus, this read can be accomplished without the generation of an interrupt and without invoking interrupt handling. Then, the dispatcher loops back to decision 152 to check the work queue again. If during any iteration of decision 152, there is no work item in the work queue, then the dispatcher sets the status field in the table 124 as "idle" for the respective logical partition (step 160). Then, the dispatcher notifies the logical partition to enter into a wait state (step 162). In this wait state, the logical partition is in a "sleeping" or "idle" mode where it is not executing any work items for an application or itself. The logical partition will remain in this wait state until receiving an interrupt indicative of a new work item in its work queue (decision 166). When such an interrupt is received, the WQMF for the logical partition sets the status field in the table 114 as "non idle" for the respective logical partition (step 168). Next, the dispatcher loops back to decision 152 to check the work queue for a work item. At this time, there should be a work item in the work queue.

Figure 6:
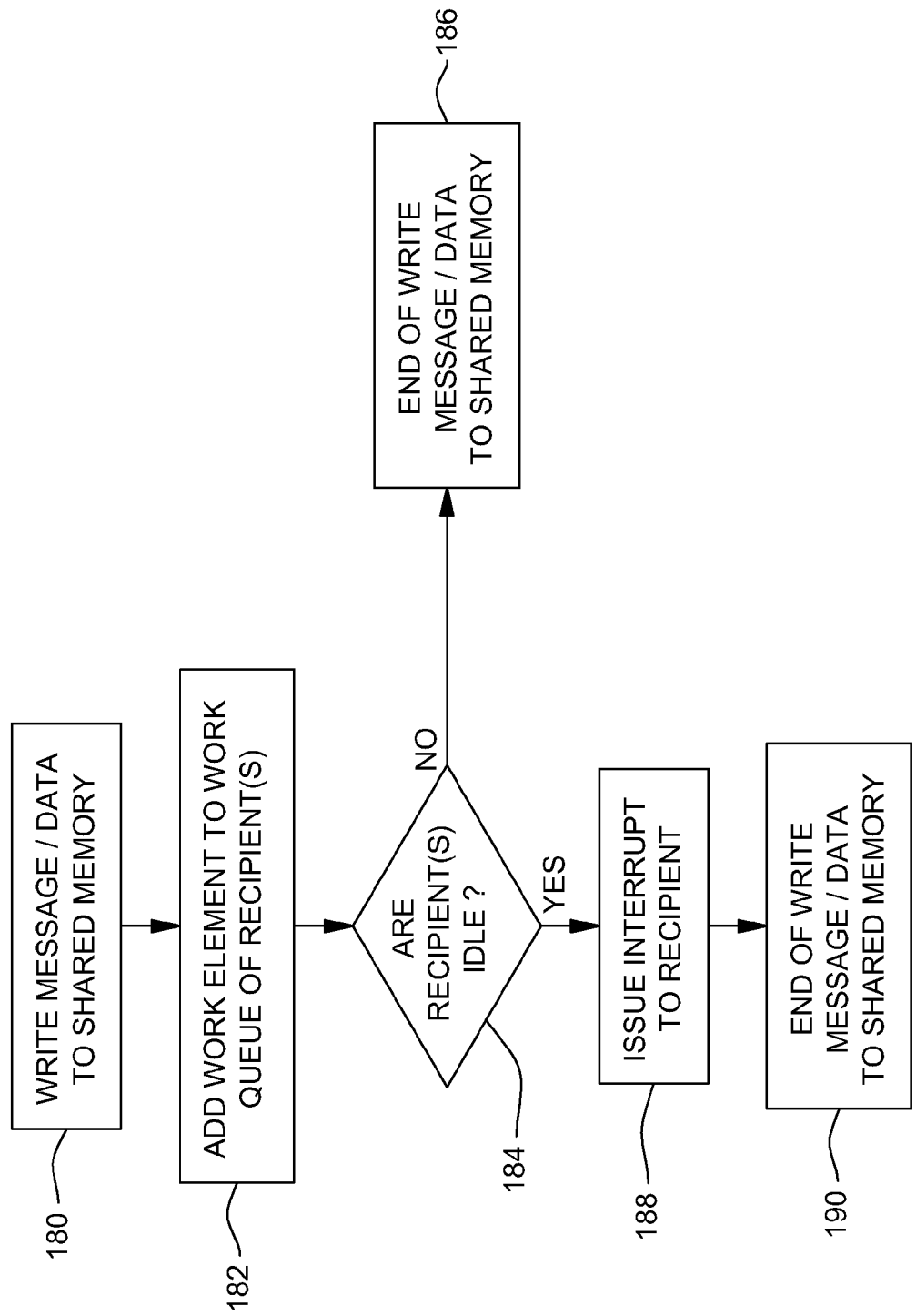
FIG. 6 is a flow chart illustrating a process implemented by a logical partition of FIG. 5 to send a message or data to another logical partition, according to the present invention.

FIG. 6 illustrates operation of one of the logical partitions, for example logical partition 112 when it desires to send a message/data to another of the logical partition, for example logical partition 114. In step 180, logical partition 112 calls its write function 133a to write data to the shared memory 121. As explained above, each of the logical partitions has direct access to the shared memory by providing the appropriate address. So, the write function 133a of logical partition 112 writes the data to the shared memory by specifying the address to be written and furnishing the data to be written. Next, WQMF 181a within logical partition 112 adds a work item to the work queue 126b of logical partition 114, by writing the work item onto the work queue (step 182). Next, WQMF 181a determines if logical partition 114 is currently idle by checking the table 124 (decision 184). If not, then the logical partition does nothing further to complete this communication and the base portion 120 is not invoked at any point in the communication process (termination step 186). In accordance with the present invention, logical partition 112 does not interrupt logical partition 114 because of the overhead involved in interrupting the logical partition. As explained above with reference to FIG. 5, when logical partition 114 completes its current work item, it will automatically invoke/call its dispatcher to check its work queue for another work item (decision 148 and step 150). At that time it will see the work item from logical partition 112. Referring again to decision 184, if logical partition 114 is idle, then in accordance with the present invention, logical partition 112 issues a "wakening" type of interrupt to logical partition 114 (step 188). The wakening type of interrupt alerts/invokes logical partition 114 that there is a work item in its queue 126b. With the issuance of this interrupt, logical partition 112 has completed its part of the data communication. The "wakening" interrupt automatically causes logical partition 114 to activate its dispatcher 122b (decision 148 of FIG. 5) to check its work queue for a work item. Dispatcher 122b then implements the steps illustrated in FIG. 5 to check its work queue 126b (step 150 and decision 152) and then read the data with read function 142(b) (step 154).

FIG. 6 also illustrates operation of one of the logical partitions, for example logical partition 112 when it desires to communicate with two or more other logical partitions, for example logical partitions 114 and 116. In step 80, logical partition 112 calls its write function 132a to write data to the shared memory 121. So, logical partition 112 writes the data to the shared memory by specifying the address to be written and furnishing the data to be written. In the example illustrated in FIG. 4, the data was written to shared memory locations beginning at address 24D00. Next, WQMF 81a within logical partition 112 adds a work item to the work queues 126b and 126c of logical partitions 114 and 116, by writing the work item, data address and data length onto the work queues (step 182). Next, WQMF 181a within logical partition 112 determines if logical partitions 114 and 116 are currently idle by checking the table 124 (decision 184). In the example illustrated in FIG. 4, logical partition 114 is idle but logical partition 116 is busy. So, for logical partition 116 which is busy, logical partition 112 does nothing further to complete the communication (termination step 186). In accordance with the present invention, logical partition 112 does not interrupt the busy logical partition 116 because of the overhead involved in interrupting a logical partition. As explained above with reference to FIG. 5, when the busy logical partition 116 completes its current work item, it will automatically check its work queue for another work item (decision 148 and step 150). At that time it will see the work item from logical partition 112 and the communication will be completed without invocation of base portion 120. Referring again to decision 184, because logical partition 114 is idle, then in accordance with the present invention, logical partition 112 issues a "wakening" type of interrupt to the idle logical partition 114 (step 188). The wakening type of interrupt alerts/invokes the idle logical partition 114 that there is a work item in its queue. With the issuance of this interrupt, logical partition 112 has completed its part of the data communication. The "wakening" interrupt automatically causes the idle logical partition 114 to invoke/call its dispatcher 122b to check its work queue for a work item. Dispatcher 122b then implements the steps illustrated in FIG. 5 to check its work queue 126b (decision 152) and then read the data (step 154).

The invention claimed is:

1. A computer program product for communicating between a first computer program in a first virtual machine and a second computer program in a second virtual machine, said first and second virtual machines being formed from a same real computer, said real computer having a memory shared by said first and second virtual machines, said computer program product comprising:

a computer readable storage media;

first program instructions for execution in said first virtual machine to dispatch work items from a first work queue in the shared memory;

second program instructions for execution in said second virtual machine to dispatch work items from a second work queue in said shared memory;

third program instructions for execution in said first virtual machine to write a message or data from said first computer program to said shared memory for said second computer program;

fourth program instructions for execution in said first virtual machine, responsive to said message or data being written to said shared memory, to update said second work queue with a first work item indicating said message or data for said second computer program, and determine if said second virtual machine is currently busy with another work item, and if so, not interrupt said second virtual machine regarding said message or data, and in response to said second virtual machine subsequently becoming available to process said message or data, said second program instructions detecting said first work item on said second work queue and notifying said second computer program to read said message or data from said shared memory, if not, interrupt said second virtual machine to invoke said second program instructions to detect said first work item on said second work queue and notify said second computer program to read said message or data from said shared memory; and wherein said first, second, third and fourth program instructions are stored on said computer readable storage media for execution by the real computer.

2. A computer program product as set forth in claim 1 wherein: said first computer program is a first application program in said first virtual machine; and said second computer program is a second application program in said second virtual machine.

3. A computer program product as set forth in claim 1 further comprising fifth program instructions to form said first and second virtual machines from said real computer; and wherein said fifth program instructions are stored on said computer readable storage media.

* * * * *